(12) United States Patent
Barker et al.

(10) Patent No.: US 10,968,761 B2
(45) Date of Patent: Apr. 6, 2021

(54) SEAL ASSEMBLY WITH IMPINGEMENT SEAL PLATE

(71) Applicant: United Technologies Corporation, Farmington, CT (US)

(72) Inventors: William M. Barker, North Andover, MA (US); Thomas E. Clark, Sandford, ME (US); Winston G. Smiddy, Saco, ME (US)

(73) Assignee: RAYTHEON TECHNOLOGIES CORPORATION, Waltham, MA (US)

( * ) Notice: Subject to any disclaimer, the term of this patent is extended or adjusted under 35 U.S.C. 154(b) by 186 days.

(21) Appl. No.: 16/246,756

(22) Filed: Jan. 14, 2019

(65) Prior Publication Data

US 2020/0149477 A1 May 14, 2020

Related U.S. Application Data

(60) Provisional application No. 62/757,539, filed on Nov. 8, 2018.

(51) Int. Cl.
*F01D 11/00* (2006.01)
*F02C 7/28* (2006.01)
*F01D 11/08* (2006.01)

(52) U.S. Cl.
CPC ............ *F01D 11/005* (2013.01); *F01D 11/08* (2013.01); *F02C 7/28* (2013.01); *F05D 2220/32* (2013.01); *F05D 2230/60* (2013.01); *F05D 2240/56* (2013.01)

(58) Field of Classification Search
CPC .... F01D 11/005; F01D 11/08; F05D 2240/11; F05D 2240/56
See application file for complete search history.

(56) References Cited

U.S. PATENT DOCUMENTS

| 6,170,831 | B1 * | 1/2001 | Bouchard | F01D 11/005 277/355 |
| 6,884,026 | B2 | 4/2005 | Glynn et al. | |
| 6,893,214 | B2 * | 5/2005 | Alford | F01D 9/04 415/138 |
| 7,562,880 | B2 * | 7/2009 | Paprotna | F16J 15/322 277/644 |
| 8,246,299 | B2 | 8/2012 | Razzell et al. | |
| 8,365,538 | B2 | 2/2013 | Buchal et al. | |

(Continued)

FOREIGN PATENT DOCUMENTS

EP 3557003 10/2019

OTHER PUBLICATIONS

European Search Report for European Patent Application No. 19207556.2 completed Mar. 12, 2020.

*Primary Examiner* — Eldon T Brockman
(74) *Attorney, Agent, or Firm* — Carlson, Gaskey & Olds, P.C.

(57) ABSTRACT

A seal assembly for a gas turbine engine according to an example of the present disclosure includes, among other things, a seal that has a seal body extending circumferentially between opposed mate faces, the seal body having a seal face that bounds a gas path and an opposed impingement face, a seal carrier extending along the impingement face, and a seal member trapped between the seal carrier and the impingement face such that the seal member is circumferentially aligned with one of the mate faces. A method of sealing is also disclosed.

19 Claims, 11 Drawing Sheets

(56) References Cited

U.S. PATENT DOCUMENTS

| | | |
|---|---|---|
| 8,651,497 B2 | 2/2014 | Tholen et al. |
| 9,863,265 B2 | 1/2018 | Stapleton |
| 2002/0187040 A1* | 12/2002 | Predmore ............. F01D 11/005 <br> 415/135 |
| 2004/0120808 A1* | 6/2004 | Alford ...................... F01D 9/04 <br> 415/173.1 |
| 2005/0173871 A1* | 8/2005 | Paprotna ............. F16J 15/3288 <br> 277/630 |
| 2014/0271105 A1* | 9/2014 | Pietrobon ............... F01D 11/08 <br> 415/1 |
| 2014/0294572 A1 | 10/2014 | Hillier et al. |
| 2017/0204737 A1 | 7/2017 | Varney et al. |
| 2017/0335705 A1 | 11/2017 | Tyler, Jr. et al. |
| 2018/0023408 A1 | 1/2018 | Rice et al. |

* cited by examiner

SEAL ASSEMBLY WITH IMPINGEMENT SEAL PLATE

CROSS REFERENCE TO RELATED APPLICATIONS

This disclosure claims benefit of United States Provisional Application No. 62/757,539 filed Nov. 8, 2018.

BACKGROUND

This disclosure relates to sealing for adjacent components of a gas turbine engine.

A gas turbine engine typically includes at least a compressor section, a combustor section and a turbine section. The compressor section pressurizes air into the combustion section where the air is mixed with fuel and ignited to generate an exhaust gas flow. The exhaust gas flow expands through the turbine section to drive the compressor section and, if the engine is designed for propulsion, a fan section.

The turbine section may include multiple stages of rotatable blades and static vanes. An annular shroud or blade outer air seal may be provided around the blades in close radial proximity to the tips of the blades to reduce the amount of gas flow that escapes around the blades. The shroud typically includes a plurality of arc segments that are circumferentially arranged in an array. The arc segments are exposed to relatively hot gases in the gas flow path and may be configured to receive cooling airflow to cool portions of the shrouds. The shroud may include impingement plates that direct the cooling airflow onto surfaces of the arc segments.

SUMMARY

A seal assembly for a gas turbine engine according to an example of the present disclosure includes a seal that has a seal body extending circumferentially between opposed mate faces, the seal body having a seal face that bounds a gas path and an opposed impingement face, a seal carrier extending along the impingement face, and a seal member trapped between the seal carrier and the impingement face such that the seal member is circumferentially aligned with one of the mate faces.

In a further embodiment of any of the foregoing embodiments, the seal is a blade outer air seal (BOAS).

In a further embodiment of any of the foregoing embodiments, the seal is made of a first material including ceramic, and the seal has a unitary construction.

In a further embodiment of any of the foregoing embodiments, the seal carrier includes a carrier body defining a recess, and the carrier body is seated against the impingement face to define an impingement cavity along the recess.

In a further embodiment of any of the foregoing embodiments, the carrier body defines a plurality of impingement apertures along the recess. Each of the impingement apertures have a passage axis that intersects the impingement face.

In a further embodiment of any of the foregoing embodiments, the seal member is a feather seal that has a pair of opposed retention tabs extending outwardly from the main body. The seal carrier defines an elongated channel dimensioned to receive the main body such that the main body bounds the impingement cavity, and the seal carrier defines an opening dimensioned to receive the pair of retention tabs to limit relative movement of the seal member.

In a further embodiment of any of the foregoing embodiments, the seal includes a pair of opposed retention hooks that extend outwardly from the seal body to define a cooling cavity, and the seal carrier includes a pair of resilient retention members on opposed sides of the carrier body. The pair of retention members are dimensioned to wedge the seal carrier in the cooling cavity between the pair of retention hooks.

In a further embodiment of any of the foregoing embodiments, the seal carrier and the seal member are integrally formed.

In a further embodiment of any of the foregoing embodiments, one of the retention hooks is positioned axially between opposed ends of the seal member.

A gas turbine engine according to an example of the present disclosure includes an engine case extending along an engine longitudinal axis, an array of blades rotatable about the engine longitudinal axis, and an array of blade outer air seal assemblies distributed about the array of blades to bound a core flow path. Each of the seal assemblies includes a seal that has a seal body extending circumferentially between opposed mate faces. The seal body has a seal face that bounds the core flow path and an opposed impingement face. An impingement plate extends circumferentially along the impingement face to define an impingement cavity. A feather seal is trapped between the impingement plate and the impingement face such that the feather seal spans across an intersegment gap defined between one of the mate faces and one of the mate faces of an adjacent one of the seal assemblies.

In a further embodiment of any of the foregoing embodiments, the impingement plate defines a plurality of impingement apertures each having a passage axis that intersects the impingement face.

In a further embodiment of any of the foregoing embodiments, the impingement plate includes a pair of radially extending abutments that are seated against the impingement face to bound the impingement cavity, and the feather seal extends between the pair of abutments along the intersegment gap to bound the impingement cavity.

In a further embodiment of any of the foregoing embodiments, the impingement plate is dimensioned to span across the intersegment gap such that the impingement plate defines the impingement cavity of the adjacent one of the blade outer air seal assemblies.

In a further embodiment of any of the foregoing embodiments, the impingement plate extends a first length relative to the engine longitudinal axis. The feather seal extends a second length relative to the engine longitudinal axis, and the second length is greater than the first length.

In a further embodiment of any of the foregoing embodiments, the seal includes a pair of opposed retention hooks that extend outwardly from a seal body to define a cooling cavity. The impingement plate includes a pair of resilient retention members on opposed sides of a carrier body, and the pair of retention members are dimensioned to wedge the impingement plate between the pair of retention hooks.

A further embodiment of any of the foregoing embodiments includes a seal support mounted to the engine case. One of the pair of retention members has at least one retention tab dimensioned to be received in the seal support to limit relative circumferential movement of the impingement plate.

A further embodiment of any of the foregoing embodiments includes at least one brush seal that seals against the seal body and the feather seal.

A method of sealing of a gas turbine engine according to an example of the present disclosure includes loading a feather seal onto an impingement plate, and trapping the feather seal between the impingement plate and a blade outer air seal such that the feather seal spans across an intersegment gap defined between a mate face of the blade outer air seal and a mate face of an adjacent blade outer air seal.

A further embodiment of any of the foregoing embodiments includes ejecting cooling airflow from impingement apertures of the impingement plate such that the cooling airflow impinges on an impingement face of the blade outer air seal.

In a further embodiment of any of the foregoing embodiments, the blade outer air seal includes a pair of opposed retention hooks that extend outwardly from a seal body to define a cooling cavity. The impingement plate includes first and second resilient retention members on opposed sides of a carrier body. The method further includes positioning the first and second retention members in the cooling cavity such that the impingement plate is wedged between the pair of retention hooks.

The various features and advantages of this invention will become apparent to those skilled in the art from the following detailed description of an embodiment. The drawings that accompany the detailed description can be briefly described as follows.

DETAILED DESCRIPTION

Figure 1:
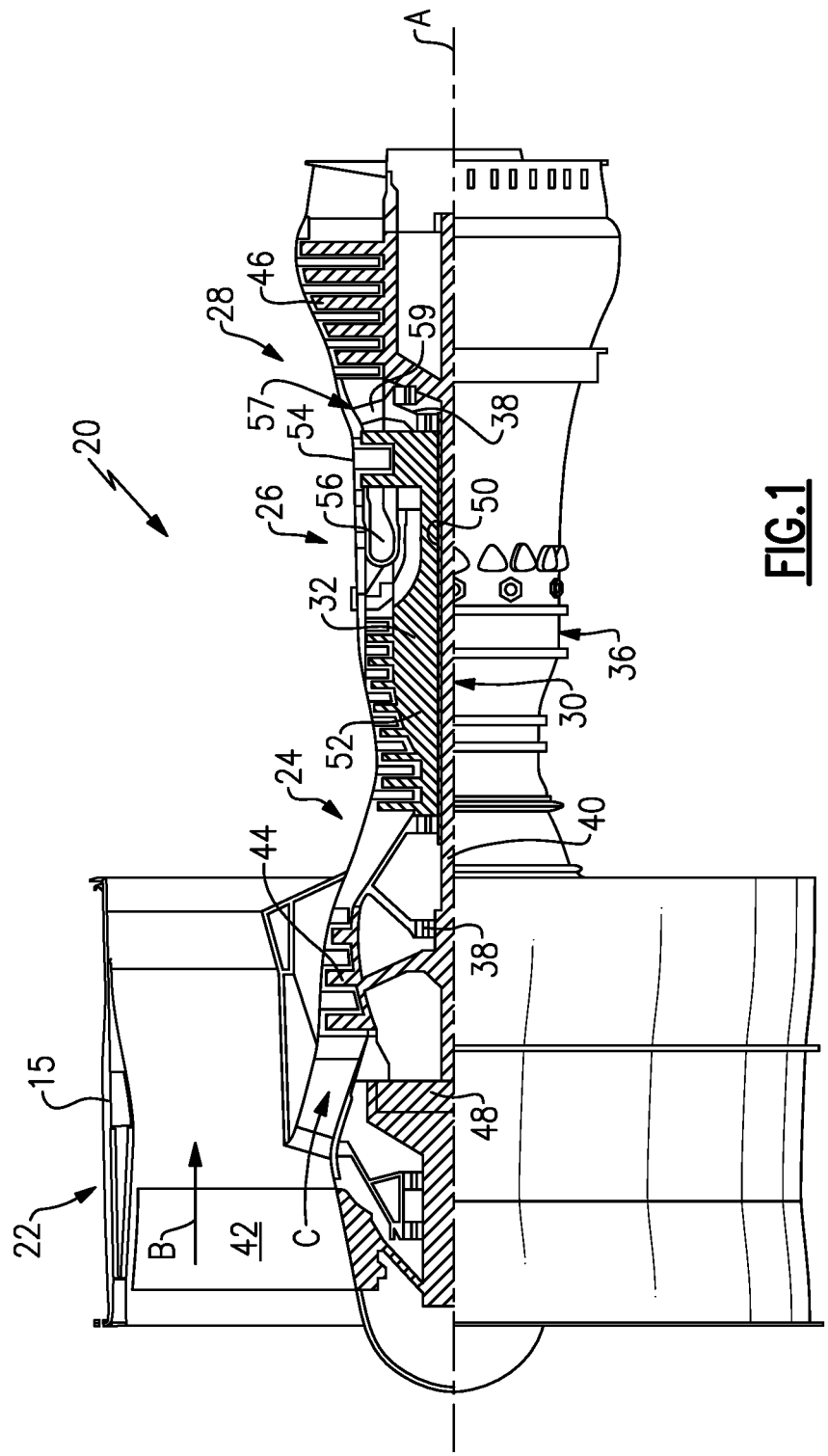
FIG. 1 shows a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a nacelle 15, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of [(Tram ° R)/(518.7° R)]$^{0.5}$. The "Low corrected fan tip speed" as disclosed herein according to one non-limiting embodiment is less than about 1150 ft/second (350.5 meters/second).

Figure 2:
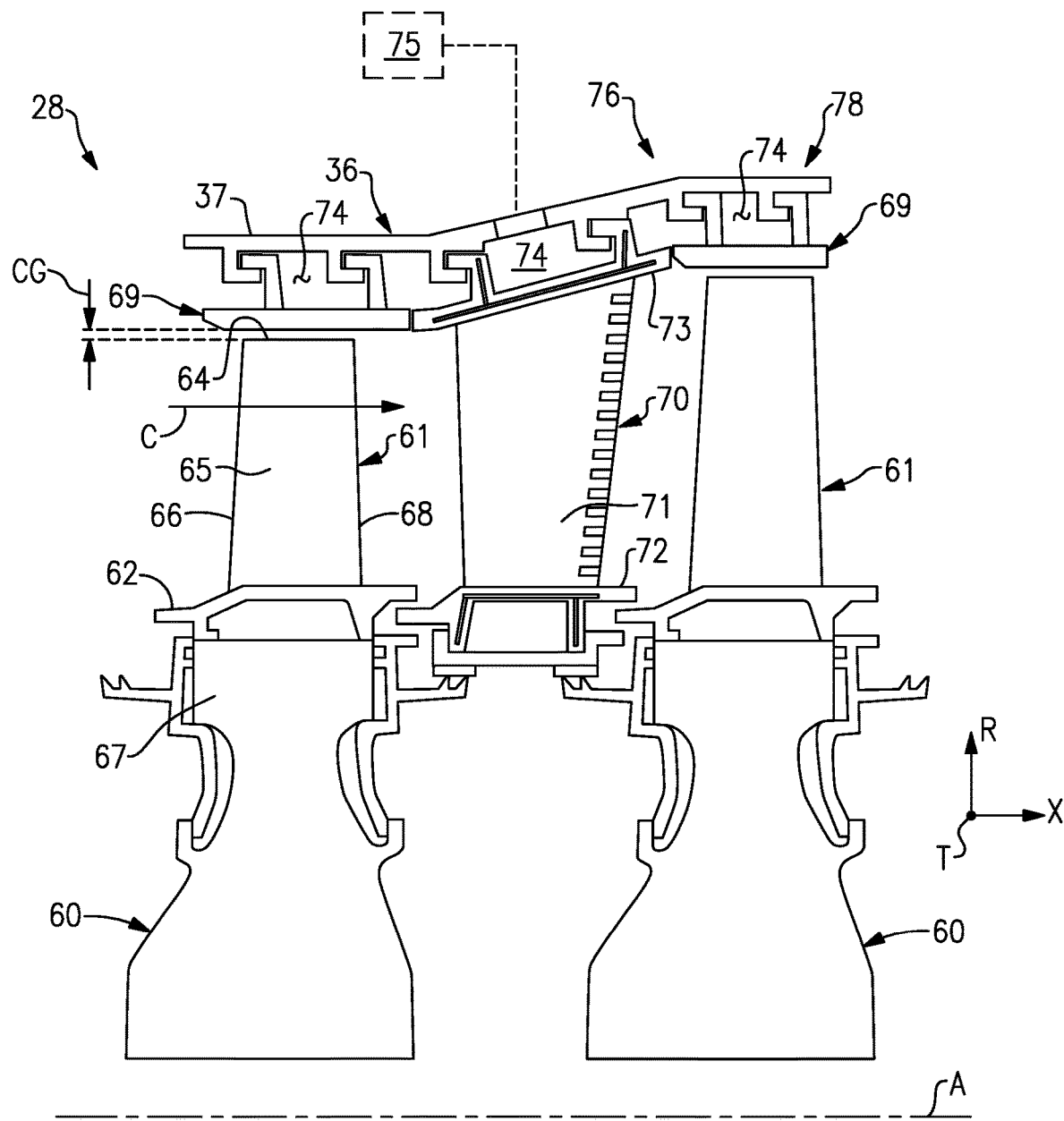
FIG. 2 shows an airfoil arrangement for a turbine section.

FIG. 2 shows selected portions of the turbine section 28 including a rotor 60 carrying one or more blades or airfoils 61 that are rotatable about the engine axis A. In this disclosure, like reference numerals designate like elements where appropriate and reference numerals with the addition of one-hundred or multiples thereof designate modified elements that are understood to incorporate the same features and benefits of the corresponding original elements. Each airfoil 61 includes a platform 62 and an airfoil section 65 extending in a radial direction R from the platform 62 to a tip 64. The airfoil section 65 generally extends in a chordwise or axial direction X between a leading edge 66 and a trailing edge 68. A root section 67 of the airfoil 61 is mounted to, or integrally formed with, the rotor 60. A blade outer air seal (BOAS) 69 is spaced radially outward from the tip 64 of the airfoil section 65. The BOAS 69 can include a plurality of seal arc segments (one shown in FIG. 4 at 169) that are circumferentially arranged in an annulus around the engine axis A. An array of the BOAS 69 are distributed about an array of the airfoils 61 to bound the core flow path C.

A vane 70 is positioned along the engine axis A and adjacent to the airfoil 61. The vane 70 includes an airfoil section 71 extending between an inner platform 72 and an outer platform 73 to define a portion of the core flow path C. The turbine section 28 includes an array of airfoils 61, vanes 70, and BOAS 69 arranged circumferentially about the engine axis A to define a turbine stage. The turbine section 28 can include a plurality of turbine stages, as illustrated by FIG. 1.

One or more cooling sources 75 (one shown) are configured to provide cooling air to one or more cooling cavities or plenums 74 defined by an engine static structure such as the engine case 37 or another portion of the engine static structure 36 (FIG. 1). The engine case 37 extends along the engine axis A. In the illustrated example of FIG. 2, the plenums 74 are defined between an engine case 37 and the outer platform 73 and/or BOAS 69. The plenums 74 are configured to receive pressurized cooling flow from the cooling source(s) 75 to cool portions of the airfoil 61, BOAS 69 and/or vane 70. Cooling sources 75 can include bleed air from an upstream stage of the compressor section 24 (FIG. 1), bypass air, or a secondary cooling system aboard the aircraft, for example. Each of the plenums 74 can extend in a circumferential or thickness direction T between adjacent airfoils 61, BOAS 69 and/or vanes 70. The tips 64 of each of the airfoil sections 65 and adjacent BOAS 69 are in close radial proximity to reduce the amount of gas flow that is redirected toward and over the rotating blade airfoil tips 64 through a corresponding clearance gap CG.

Figure 3:
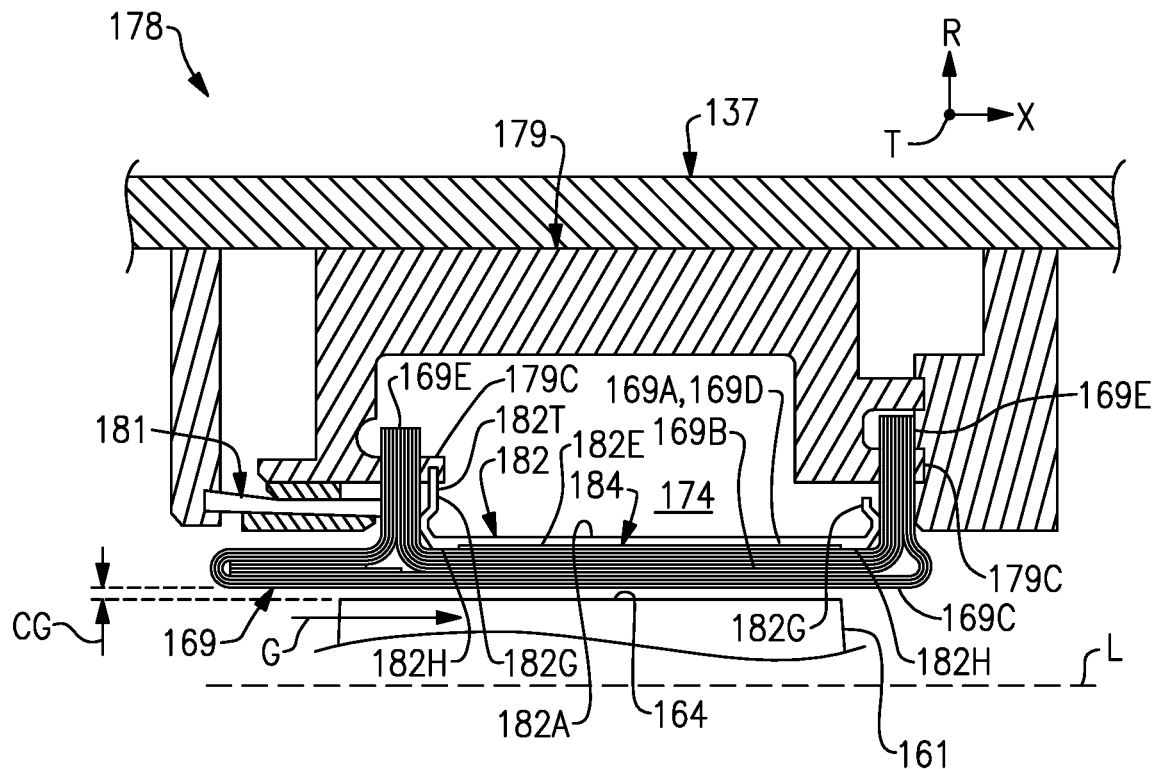
FIG. 3 illustrates a sectional view of a seal assembly mounted to a seal support according to an example.

FIGS. 3-9 illustrate an exemplary seal assembly 178 for sealing portions of a gas turbine engine. The seal assembly 178 can be incorporated into a portion of the gas turbine engine 20, including the turbine section 28 of FIGS. 1 and 2. The seal assembly 178 includes at least one component that seals or otherwise bounds a portion of a gas path G (FIG. 3). In the illustrated example of FIGS. 3-10, the component is a blade outer air seal (BOAS) 169 situated adjacent to airfoil 161 to define a clearance gap CG (FIG. 3). In other examples, the component is an airfoil 61 or vane 70 (FIG. 2). Other portions of the gas turbine engine can benefit from the teachings disclosed herein, including combustor panels and transition ducts, and other systems including land-based industrial turbines.

Referring to FIG. 3, the seal assembly 178 includes a seal support 179 mounted to an engine case 137. The engine case 137 can be incorporated into a portion of an engine static structure, such as the engine static structure 36 of FIGS. 1-2. Various techniques can be utilized to mount the seal support 179 to the engine case 137, such as mechanically attaching the seal support 179 with one or more fasteners. The engine case 137 extends along a longitudinal axis L. The longitudinal axis L can be collinear or parallel to the engine longitudinal axis A of FIGS. 1-2.

The seal assembly 178 can include at least one brush seal assembly 181 that is arranged to seal against portions of the seal 169. The brush seal assembly 181 can include a carrier mounted to the engine case 137.

Figure 3A:
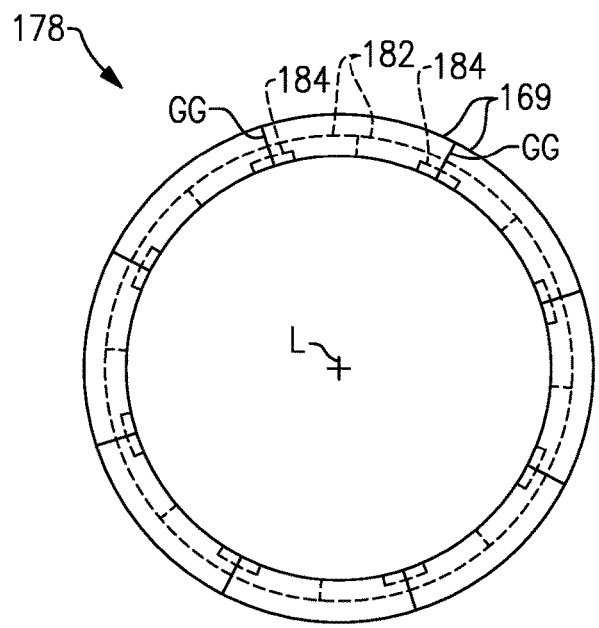
FIG. 3A illustrates a schematic view of the seal assembly of FIG. 3 including an array of seals, seal carriers and seal members.

Each seal assembly 178 includes at least one seal carrier 182 and seal member 184. In the illustrated example of FIGS. 3-9, the seal carrier 182 is an impingement plate, and the seal member 184 is a feather seal. The seal carrier 182 and seal member 184 are situated at least partially inside of a cooling cavity 174 defined between the seal 169 and seal support 179. The seal carrier 182 and the seal member 184 are separate and distinct components that cooperate to bound an intersegment gap GG (FIGS. 6 and 8) between opposed mate faces 169B of adjacent seals 169. A plurality of seals 169, seal carriers 182 and seal members 184 can be arranged in an array about the longitudinal axis L, as illustrated schematically in FIG. 3A.

Figure 4:
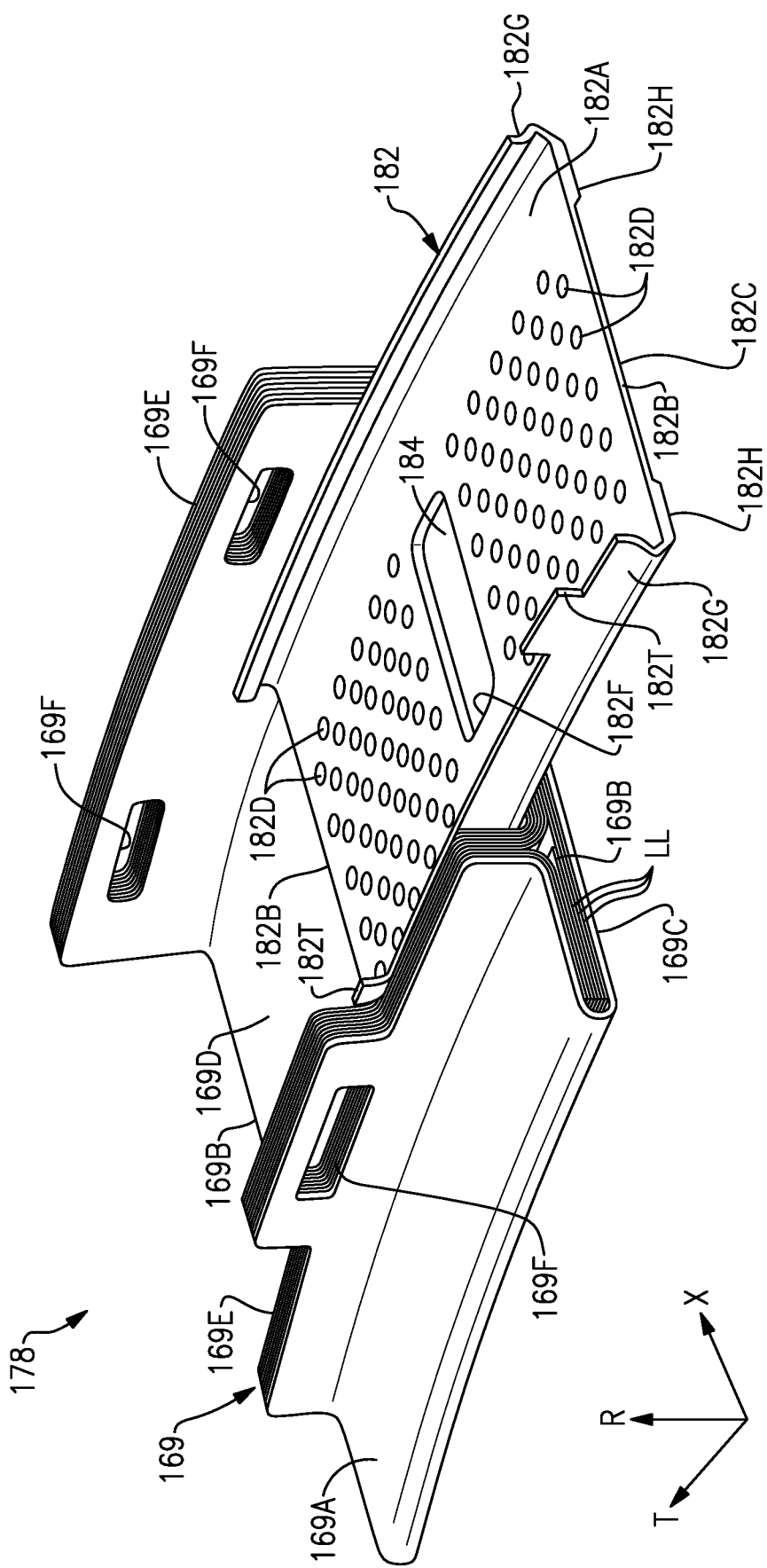
FIG. 4 illustrates a perspective view of the seal assembly of FIG. 3 in an unmounted position.
Figure 5:
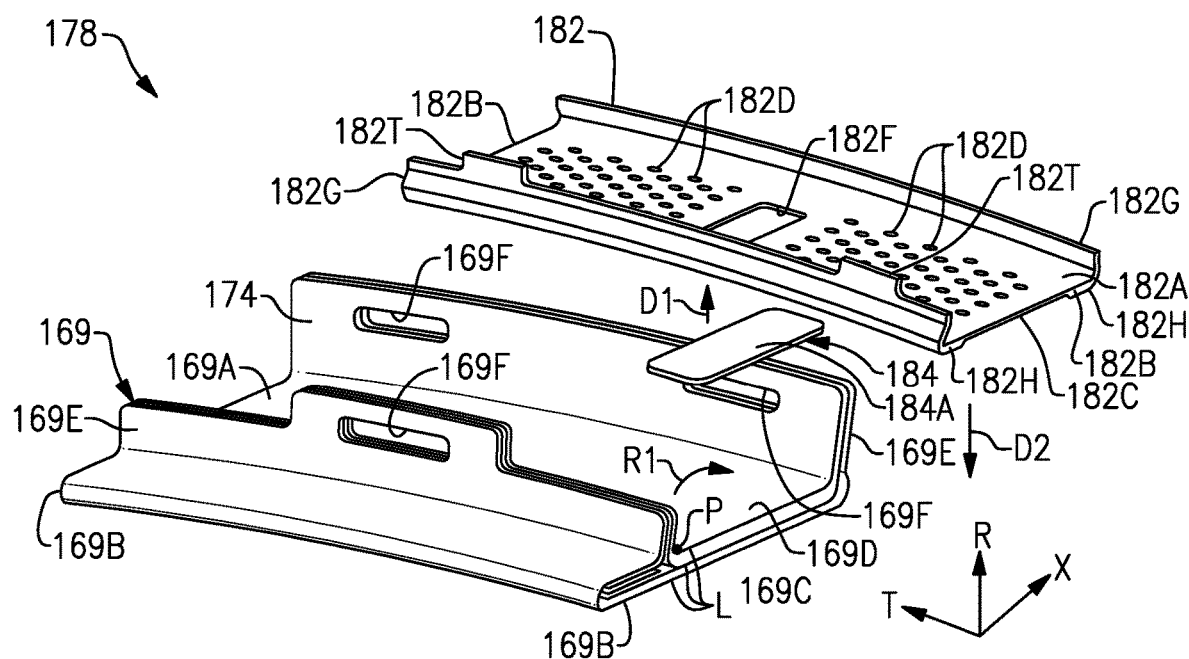
FIG. 5 illustrates an exploded perspective view of the seal assembly of FIG. 4.
Figure 9:
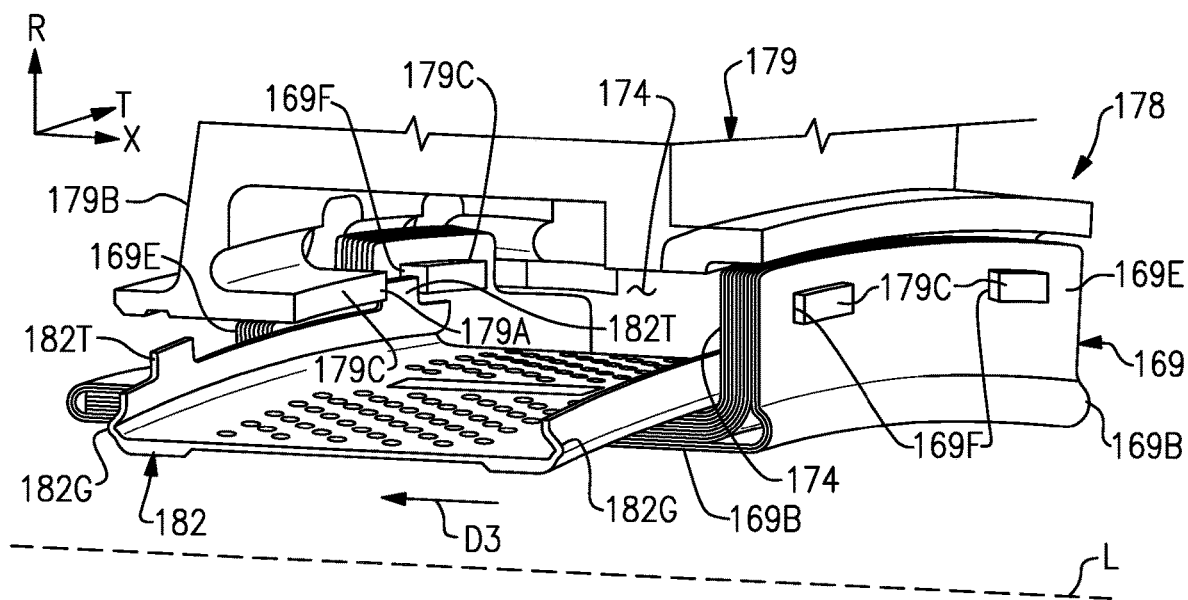
FIG. 9 illustrates a perspective view of the seal assembly mounted to the seal support of FIG. 3.

Referring to FIGS. 4 and 5, with continued reference to FIG. 3, each seal 169 includes a seal body 169A extending in a circumferential or thickness direction T between opposed mate faces 169B. The seal body 169A has a generally arcuate geometry and includes a seal face 169C that bounds the gas path G and an opposed impingement face 169D that faces towards the cooling cavity 174 (FIG. 3). The seal 169 includes a pair of opposed retention hooks 169E that extend radially outwardly from the seal body 169A to define the cooling cavity 174. The retention hooks 169E are dimensioned to mount the seal 169 to the seal support 179. The seal body 169A can define one or more slots 169F in a thickness of the seal body 169A that are dimensioned to receive respective hooks 179C of the seal support 179, as illustrated by FIGS. 3 and 9.

Various materials can be utilized to manufacture the seal 169, seal carrier 182 and seal member 184. In examples, the outer air seal 169 is made of a first material, and the seal carrier 182 and/or seal member 184 are made of a second, different material. For example, the first material can include a ceramic or ceramic matrix composite (CMC) material. The seal 169 can be formed from one or more layers LL of a CMC layup. The seal 169 can be made of another material, such as a high temperature metal, alloy, or composite material. The seal carrier 182 and/or seal member 184 can be made of a second material such as a high temperature composite, metal, or alloy, such as a nickel or cobalt-based superalloy, for example. The first and second materials can differ. In other examples, the seal 169 is made of a first material, and the seal carrier 182 and/or seal member 184 is made of a second material that is the same as the first material, including any of the materials disclosed herein. The seal 169 can be formed to have a unitary construction. In some examples, the seal carrier 182 and/or seal member 184 is made from sheet metal, or other materials with moderate temperature capability, which may include but not limited to Inconel, Cobalt-Chrome, Hastelloy, Nickel etc. and is formed to a desired geometry.

In examples, the seal carrier 182 is made of one or more layers of a reflective material that serves to deflect radiation from hot gases in the gas path G. Exemplary reflective materials can include metallic materials such as platinum, carbon-based materials, ceramics and composites with relatively lower silicon content.

Figure 8:
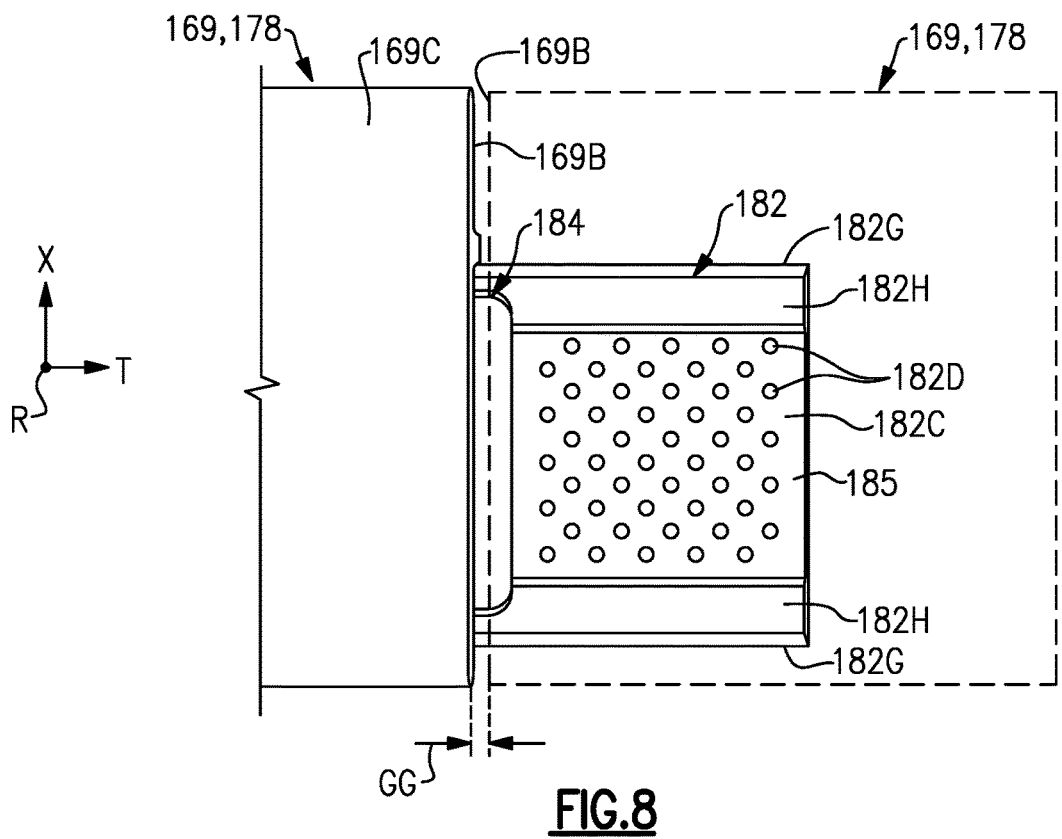
FIG. 8 illustrates a radial view of the seal assembly of FIG. 4.

The seal carrier 182 is dimensioned to extend along a portion of the impingement face 169D. In an installed position, the seal member 184 is trapped between the seal carrier 182 and impingement face 169D such that the main body 184A of the seal member 184 is circumferentially aligned with and extends circumferentially past one of the mate faces 169B, as illustrated by FIG. 8.

The seal carrier 182 includes a carrier body 182A extending circumferentially between opposed sidewalls 182B. The seal carrier 182 includes a pair of resilient retention members 182G on opposed sides of the carrier body 182A. The retention members 182G can be contoured and can be biased to seal against surfaces of the cooling cavity 174 defined by the seal 169. The retention members 182G are dimensioned to wedge the seal carrier 182 in the cooling cavity 174 between the retention hooks 169E, as illustrated by FIGS. 3 and 4.

The carrier body 182A defines a circumferentially extending groove or recess 182C. The carrier body 182A is seated against the impingement face 169D to define an impingement cavity 185 along the recess 182C, as illustrated by FIG. 6 (with adjacent seals 169 shown in dashed lines for illustrative purposes).

The carrier body 182A can define a plurality of impingement apertures 182D along the recess 182C that communicate with the cooling cavity 174 (FIG. 3). Each of the impingement apertures 182D has a passage axis PA that intersects the impingement face 169D, as illustrated by FIG. 6. The impingement apertures 182D can be distributed at various locations along the carrier body 182A. In the illustrated example of FIG. 4, the impingement apertures 182D are defined as sets on opposed sides of the seal member 184. Each impingement aperture 182D can have various geometries, such as an elliptical, rectangular or other complex geometry. The impingement apertures 182D are oriented to eject cooling airflow F from the cooling cavity 174 (FIG. 3) such that the cooling airflow F impinges on an impingement face 169D of the seal 169 to provide backside cooling, as illustrated by FIG. 6.

Figure 6:
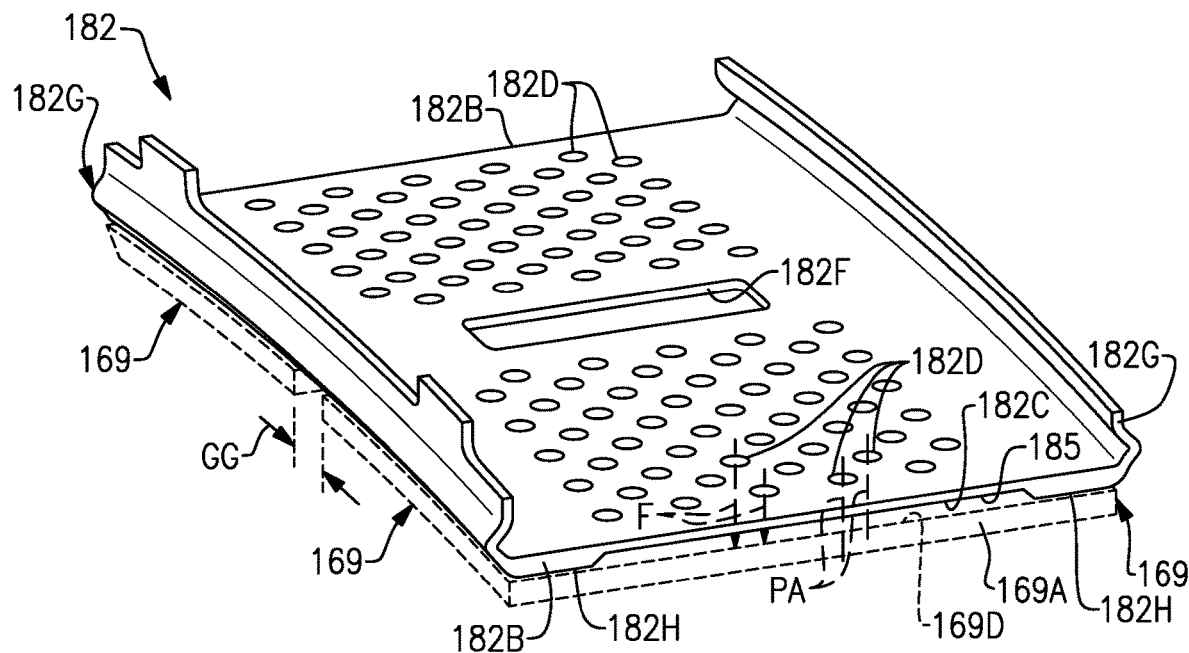
FIG. 6 illustrates a perspective view of a seal member for the seal assembly of FIG. 4.
Figure 7:
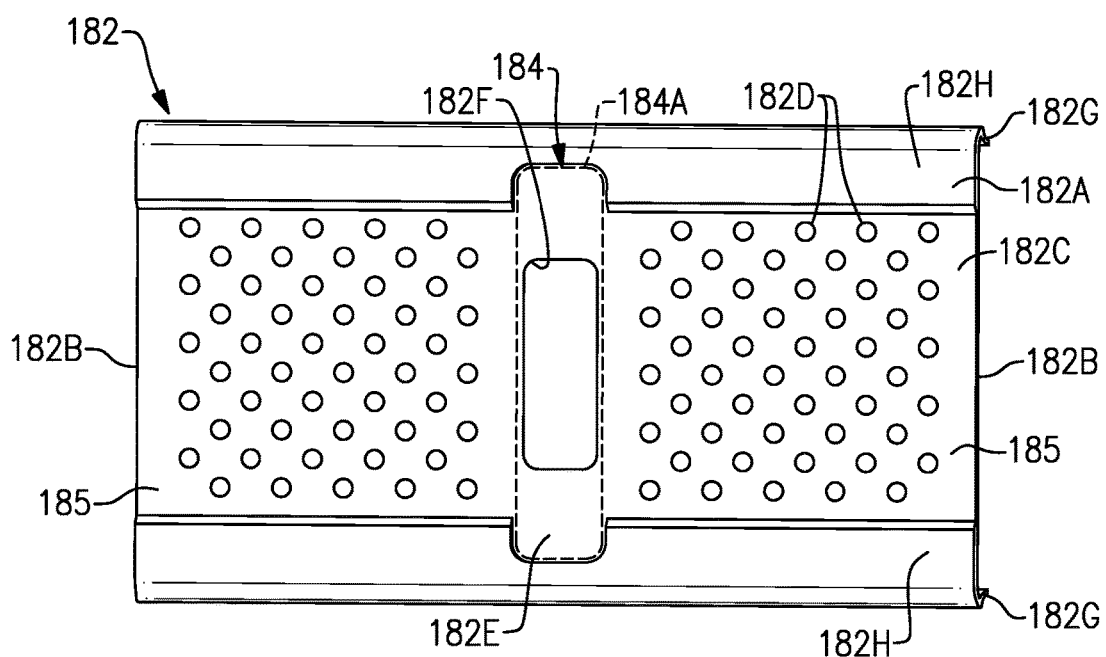
FIG. 7 illustrates a radial view of the seal member of FIG. 6.

Referring to FIGS. 6-7, the carrier body 182A can define an elongated slot or opening 182F that exposes at least a portion of the seal member 184. Cooling airflow F from the cooling cavity 174 can circulate or otherwise move along surfaces of the seal member 184 adjacent the opening 182F to cool portions of the seal member 184 during engine operation. In other examples, the opening 182F is omitted and the seal member 184 is completely covered by the carrier body 182A.

As illustrated by FIGS. 3 and 7, the carrier body 182A defines an elongated channel 182E dimensioned to receive the main body 184A of the seal member 184 (shown in dashed lines in FIG. 7 for illustrative purposes). The channel 182E is dimensioned to receive the main body 184A of the seal member 184 such that opposed sides of the main body 184A bound adjacent impingement cavities 185 defined by the seal carrier 182.

The seal carrier 182 includes a pair of radially extending abutments 182H that are dimensioned to be seated against the impingement face 169D to bound each respective impingement cavity 185. Each impingement cavity 185 extends axially between the opposed abutments 182H.

Referring to FIG. 8, the seal member 184 extends between the abutments 182H along the intersegment gap GG to bound the impingement cavity 185. The abutments 182H and retention members 182G abut against surfaces of the seal 169 to reduce leakage of cooling airflow from the cooling cavity 174, which can increase cooling efficiency. The intersegment gap GG extends in a circumferential or thickness direction T between opposed mate faces 169B of adjacent seals 169 (an adjacent seal 169 shown in dashed lines for illustrative purposes). The seal carrier 182 is dimensioned to span across the intersegment gap GG such that the seal carrier 182 defines the impingement cavity 185 of an adjacent one of the seal assemblies 178.

Referring to FIG. 9, with continued reference to FIGS. 3-5, the seal carrier 182 can include one or more retention tabs 182T that extend radially outwardly from one of the retention members 182G. Each retention tab 182T is dimensioned to be received in a respective slot 179A or opening in a body 179B of the seal support 179 to limit relative circumferential movement of the seal carrier 182 and can serve an anti-rotation function to reduce rotation of the seal carrier 182. The seal body 169A can define one or more slots 169F in a thickness of the seal body 169A that are dimensioned to receive respective hooks 179C of the seal support 179.

The seal assembly 178 can be assembled as follows. Referring to FIG. 5, the seal member 184 is loaded onto the seal carrier 182 by moving the seal member 184 in a direction D1 such that the seal member 184 is received in the channel 182E of the seal carrier 182, as illustrated by FIGS. 4 and 8. Thereafter, the seal carrier 182 is moved in a direction D2 toward the seal 169 such that the retention members 182G are positioned in the cooling cavity 174 to wedge the seal carrier 182 between the retention hooks 169E and such that the seal member 184 is trapped between the seal carrier 182 and the impingement face 169D of the seal 169, as illustrated by FIGS. 3 and 4. Movement in the direction D2 can include causing one of the retention members 182G to abut against one of the retention hooks 169E at point P running circumferentially along the retention hook 169E and then pivoting the seal carrier 182 in a direction R1 about point P and into the cavity between the retention hooks 169E to wedge the seal carrier 182. Referring to FIG. 9, the seal 169 can then be moved together with the seal carrier 182 and seal member 184 as a sub-assembly in a third direction D3 such that the seal 169 is mounted onto the hooks 179C of the seal support 179 to secure the seal assembly 178 to the engine case 137.

Figure 10:
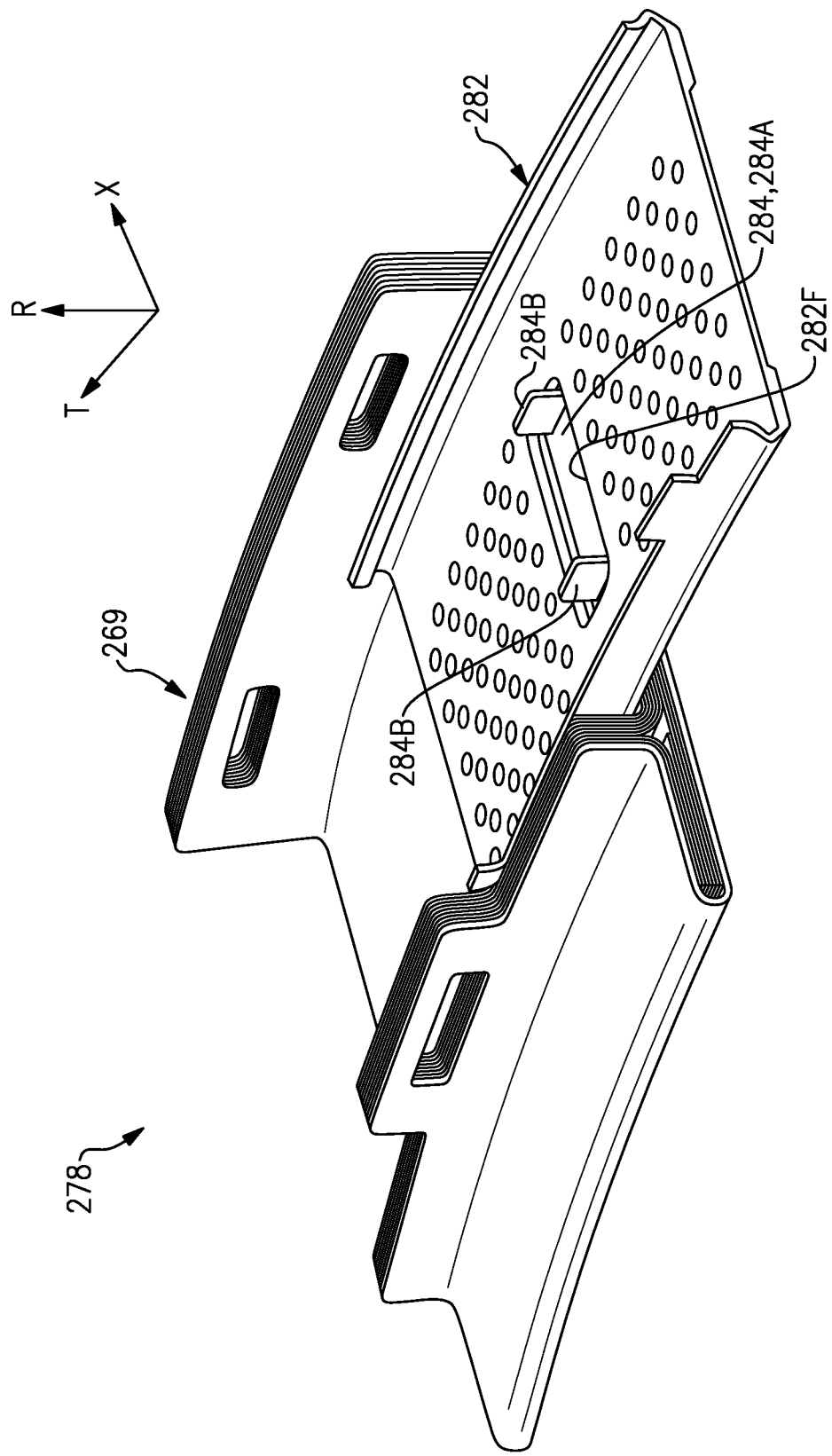
FIG. 10 illustrates a perspective view of a seal assembly according to another example.

FIG. 10 illustrates a seal assembly 278 according to another example. Seal member 284 includes a pair of opposed retention tabs 284B that extend radially outwardly from main body 284A. Seal carrier 282 defines an opening 282F dimensioned to receive the retention tabs 284B to limit relative movement of the seal member 284.

Figure 11:
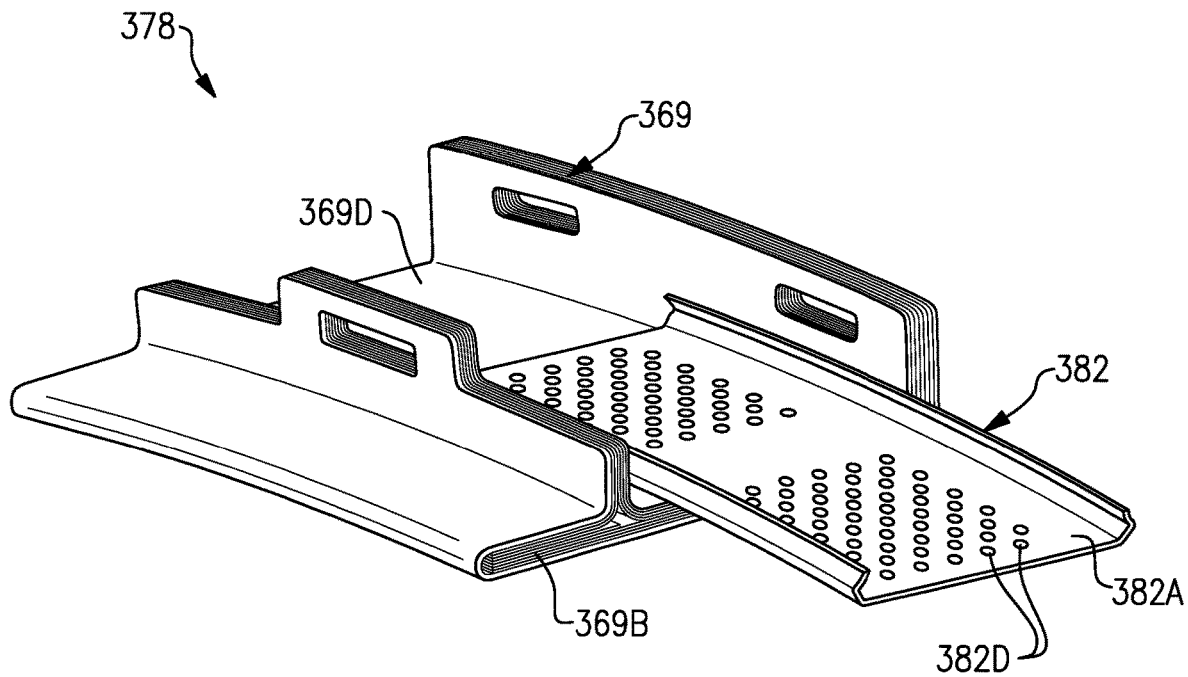
FIG. 11 illustrates a perspective view of a seal assembly according to yet another example.
Figure 12:
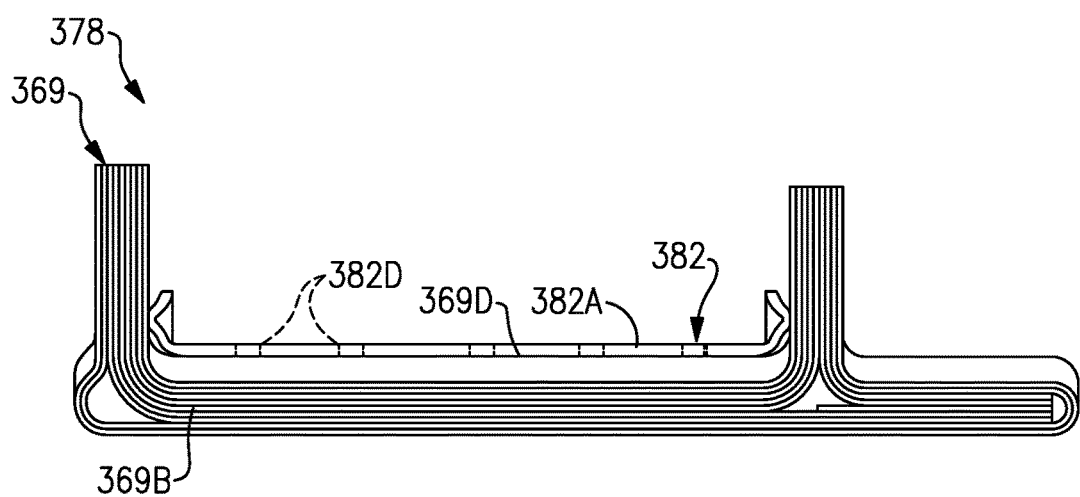
FIG. 12 illustrates a sectional view of a seal member taken along a mate face of the seal assembly of FIG. 11.

FIGS. 11 and 12 illustrate a seal assembly 378 for a gas turbine engine according to yet another example. An opening in seal carrier 382 is omitted such that carrier body 382A directly abuts against substantially all of the portions of the impingement face 369D along an adjacent mate face 369B of seal 369 when in an installed position. The seal carrier 382 serves as both an impingement plate and a feather seal integrally formed with the impingement plate.

Figure 13:
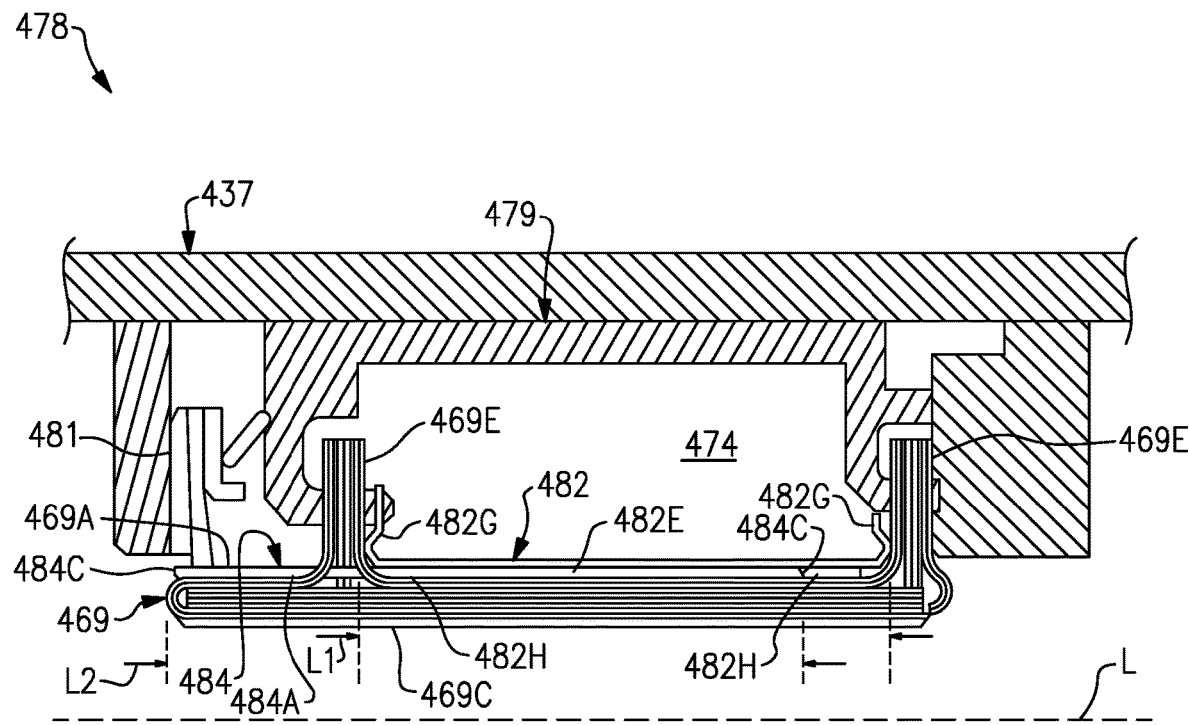
FIG. 13 illustrates a sectional view of a seal assembly mounted to a seal support according to another example.
Figure 14:
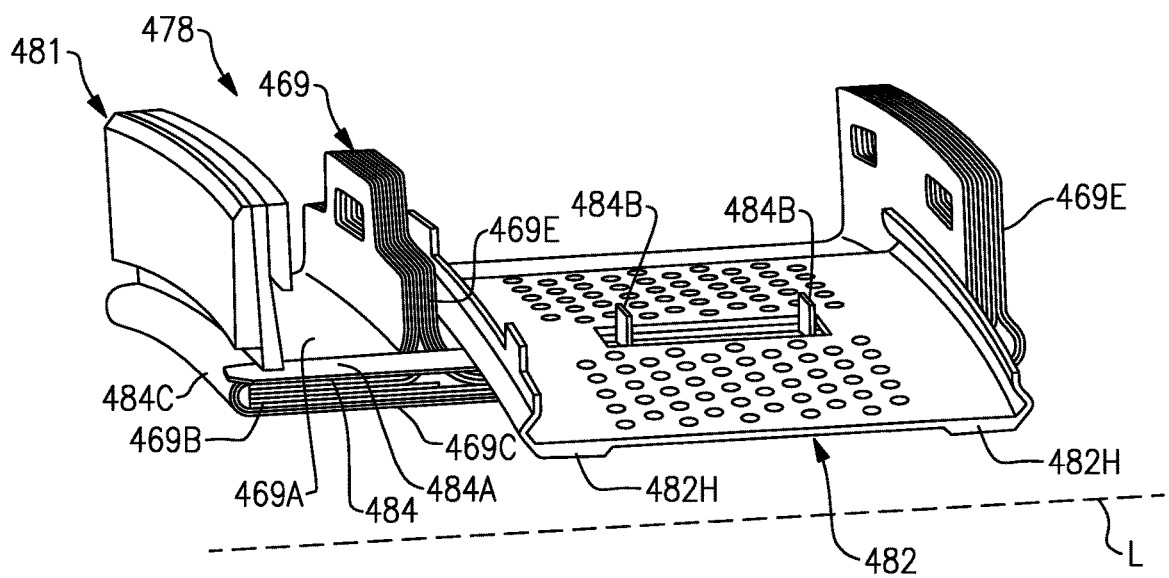
FIG. 14 illustrates a perspective view of the seal assembly of FIG. 13 in an unmounted position.
Figure 15:
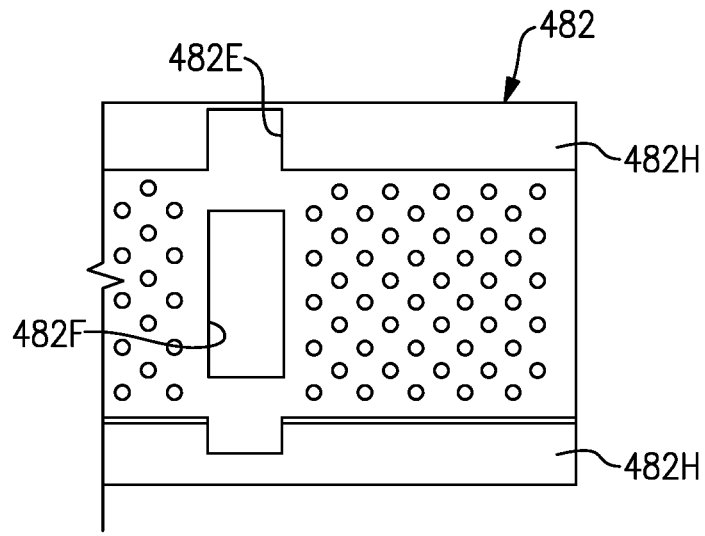
FIG. 15 illustrates a radial view of a seal carrier for the seal assembly of FIG. 14.
Figure 16:
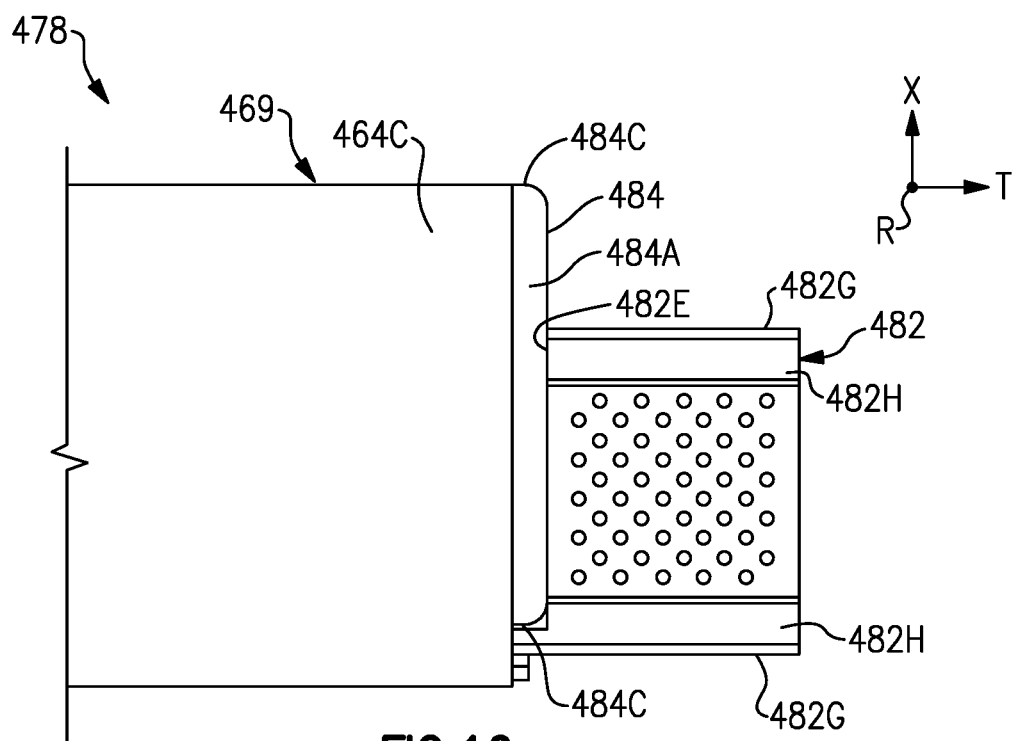
FIG. 16 illustrates a radial view of the seal assembly of FIG. 14.

FIGS. 13-16 illustrate a seal assembly 478 according to another example. The seal member 484 is dimensioned such that a main body 484A of the seal member 484 extends axially forward or past at least one retention member 482G of the seal carrier 482 and such that at least one retention hook 469E of seal 469 is positioned axially between opposed axial ends 184C of the seal member 484, as illustrated by FIGS. 13-14 and 16. In examples, the main body 484A can extend axially aft of the seal carrier 482.

Referring to FIGS. 15-16, the seal carrier 482 defines an elongated channel 482E to receive a portion of the seal member 484. The channel 482E is defined by one or more abutments 482H such that at least a portion of the seal member 484 extends in an axial direction X past at least one of the retention members 482G. The seal carrier 482 extends a first length L1 and the seal member 484 extends a second length L2 along the adjacent mate face 469B relative to longitudinal axis L, with the second length L2 being greater than the first length L1 (FIG. 13). At least one brush seal assembly 481 can be arranged relative to the seal assembly 478 such that the brush seal assembly 481 seals against the seal body 469A and a radially outer face of the seal member 484, as illustrated by FIGS. 13-14.

The seal assemblies 178, 278, 378, 478 disclosed herein, including the respective seal members and seal carriers, can eliminate or reduce a need for internal mandrels that may otherwise be used for fabrication of CMC BOAS, which can simplify manufacturing. The arrangement of the disclosed seal assemblies 178, 278, 378, 478 can also reduce assembly complexity and manufacturing costs. The substantially radially extending retention hooks of the disclosed seals 169, 269, 369, 469 can provide for relatively greater direct radially load transfer, which can reduce a likelihood of delamination of layers of CMC BOAS, and can be utilized to establish sealing surfaces with the respective seal carrier to reduce leakage. The arrangement of the retention hooks of the disclosed seals 169, 269, 369, 469, including an open cavity extending from the respective impingement faces can reduce a need for center/core one-piece or two-piece mandrels. The disclosed arrangements of seal members and seal carriers, including trapping the seal member between the seal carrier and respective seal, can also be utilized to eliminate feather seal slots formed in the mate faces of adjacent seals 169, 269, 369, 469, which can also reduce a likelihood of delamination and improve strength and durability.

It should be understood that relative positional terms such as "forward," "aft," "upper," "lower," "above," "below," and the like are with reference to the normal operational attitude of the vehicle and should not be considered otherwise limiting.

Although the different examples have the specific components shown in the illustrations, embodiments of this disclosure are not limited to those particular combinations. It is possible to use some of the components or features from one of the examples in combination with features or components from another one of the examples.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed is:

1. A seal assembly for a gas turbine engine comprising:
a seal including a seal body extending circumferentially between opposed mate faces, the seal body having a seal face that bounds a gas path and an opposed impingement face;
a seal carrier extending along the impingement face;
a seal member trapped between the seal carrier and the impingement face such that the seal member is circumferentially aligned with one of the mate faces;
wherein the seal carrier includes a carrier body defining a recess, and the carrier body is seated against the impingement face to define an impingement cavity along the recess; and
wherein the seal includes a pair of opposed retention hooks that extend outwardly from the seal body to define a cooling cavity, and the seal carrier includes a pair of resilient retention members on opposed sides of the carrier body, the pair of retention members dimensioned to wedge the seal carrier in the cooling cavity between the pair of retention hooks.

2. The seal assembly as recited in claim 1, wherein the seal is a blade outer air seal (BOAS).

3. The seal assembly as recited in claim 2, wherein the seal is made of a first material including ceramic, and the seal has a unitary construction.

4. The seal assembly as recited in claim 1, wherein the carrier body defines a plurality of impingement apertures along the recess, each of the impingement apertures having a passage axis that intersects the impingement face.

5. The seal assembly as recited in claim 4, wherein the carrier body defines an elongated channel in a thickness of the carrier body, and the channel is dimensioned to receive a portion of the seal member.

6. The seal assembly as recited in claim 1, wherein the seal carrier and the seal member are integrally formed.

7. The seal assembly as recited in claim 1, wherein one of the retention hooks is positioned axially between opposed ends of the seal member.

8. A seal assembly for a gas turbine engine, comprising:
a seal including a seal body extending circumferentially between opposed mate faces, the seal body having a seal face that bounds a gas path and an opposed impingement face;
a seal carrier extending along the impingement face;
a seal member trapped between the seal carrier and the impingement face such that the seal member is circumferentially aligned with one of the mate faces;
wherein the seal carrier includes a carrier body defining a recess, and the carrier body is seated against the impingement face to define an impingement cavity along the recess; and
wherein the seal member is a feather seal including a pair of opposed retention tabs extending outwardly from a main body of the feather seal, the seal carrier defines an elongated channel dimensioned to receive the main body such that the main body bounds the impingement cavity, and the seal carrier defines an opening dimensioned to receive the pair of retention tabs to limit relative movement of the seal member.

9. A gas turbine engine comprising:
an engine case extending along an engine longitudinal axis;
an array of blades rotatable about the engine longitudinal axis; and
an array of blade outer air seal assemblies distributed about the array of blades to bound a core flow path, wherein each of the seal assemblies comprises:
a seal including a seal body extending circumferentially between opposed mate faces, the seal body having a seal face that bounds the core flow path and an opposed impingement face;
an impingement plate extending circumferentially along the impingement face to define an impingement cavity;
a feather seal trapped between the impingement plate and the impingement face such that the feather seal spans across an intersegment gap defined between one of the mate faces and one of the mate faces of an adjacent one of the seal assemblies; and
wherein the seal includes a pair of opposed retention hooks that extend outwardly from the seal body to define a cooling cavity, the impingement plate includes a pair of resilient retention members on opposed sides of a carrier body, and the pair of retention members are dimensioned to wedge the impingement plate between the pair of retention hooks.

10. The gas turbine engine as recited in claim 9, wherein the impingement plate defines a plurality of impingement apertures each having a passage axis that intersects the impingement face.

11. The gas turbine engine as recited in claim 9, wherein the impingement plate includes a pair of radially extending abutments that are seated against the impingement face to bound the impingement cavity, and the feather seal extends between the pair of abutments along the intersegment gap to bound the impingement cavity.

12. The gas turbine engine as recited in claim 11, wherein the impingement plate is dimensioned to span across the intersegment gap such that the impingement plate defines the impingement cavity of the adjacent one of the blade outer air seal assemblies.

13. The gas turbine engine as recited in claim 12, wherein the impingement plate includes an elongated channel that receives a portion of the feather seal.

14. The gas turbine engine as recited in claim 13, wherein the impingement plate defines a plurality of impingement apertures along the recess.

15. The gas turbine engine as recited in claim 9, wherein the impingement plate extends a first length relative to the engine longitudinal axis, the feather seal extends a second length relative to the engine longitudinal axis, and the second length is greater than the first length.

16. The gas turbine engine as recited in claim 9, further comprising a seal support mounted to the engine case, wherein one of the pair of retention members includes at least one retention tab dimensioned to be received in the seal support to limit relative circumferential movement of the impingement plate.

17. The gas turbine engine as recited in claim 9, further comprising at least one brush seal that seals against the seal body and the feather seal.

18. A method of sealing of a gas turbine engine comprising:
loading a feather seal onto an impingement plate;
trapping the feather seal between the impingement plate and a blade outer air seal such that the feather seal spans across an intersegment gap defined between a mate face of the blade outer air seal and a mate face of an adjacent blade outer air seal;
wherein the blade outer air seal includes a pair of opposed retention hooks that extend outwardly from a seal body to define a cooling cavity, the impingement plate includes first and second resilient retention members on opposed sides of a carrier body; and
positioning the first and second retention members in the cooling cavity such that the impingement plate is wedged between the pair of retention hooks.

19. The method as recited in claim 18, further comprising ejecting cooling airflow from impingement apertures of the impingement plate such that the cooling airflow impinges on an impingement face of the blade outer air seal.

* * * * *